United States Patent [19]
Oh

[11] Patent Number: 5,196,996
[45] Date of Patent: Mar. 23, 1993

[54] HIGH VOLTAGE GENERATING CIRCUIT FOR SEMICONDUCTOR DEVICES HAVING A CHARGE PUMP FOR ELIMINATING DIODE THRESHOLD VOLTAGE LOSSES

[75] Inventor: Jong H. Oh, Ichonkun, Rep. of Korea

[73] Assignee: Hyundai Electronics Industries Co., Ltd., Kyoungkido, Rep. of Korea

[21] Appl. No.: 744,482

[22] Filed: Aug. 13, 1991

[30] Foreign Application Priority Data

Aug. 17, 1990 [KR] Rep. of Korea ............... 1990-12703

[51] Int. Cl.$^5$ .......................................... H02M 3/07
[52] U.S. Cl. ................................. 363/60; 307/296.2
[58] Field of Search ................. 363/60; 307/296.2

[56] References Cited

U.S. PATENT DOCUMENTS 4,559,548 12/1985 Iizuka et al. .................. 363/60
4,621,315 11/1986 Vaughn et al. ................ 363/60
4,733,108 3/1988 Truong ...................... 307/296.2

FOREIGN PATENT DOCUMENTS 303193 2/1989 European Pat. Off. .
2020924 11/1979 United Kingdom ............ 363/60

Primary Examiner—William H. Beha, Jr.
Attorney, Agent, or Firm—Darby & Darby

[57] ABSTRACT

A high voltage generating circuit for semi-conductor devices which removes a threshold voltage and generates a high voltage above a source voltage or a negative voltage below a ground voltage, comprising an oscillation signal generating circuit, clamping circuits 51 and 52 and charge pump circuits 53 and 54, for inputting first to fourth oscillation signals from said oscillation signal generating means, and a charge transfer circuit 55. Also, the high voltage generating circuit according to the present invention comprises an initial state control circuit 56 for controlling an initial state of a final output stage Vpp. The present high voltage generating circuit removes a threshold voltage loss in clamping and charge transfer devices to increase an efficiency of the semi-conductor device. Therefore, a sufficient high voltage above the source voltage can be used to prevent a malfunction of the semi-conductor device.

10 Claims, 6 Drawing Sheets

HIGH VOLTAGE GENERATING CIRCUIT FOR SEMICONDUCTOR DEVICES HAVING A CHARGE PUMP FOR ELIMINATING DIODE THRESHOLD VOLTAGE LOSSES

BACKGROUND OF THE INVENTION

1. Field of the Invention

The present invention relates in general to semi-conductor devices, and more particularly to a high voltage generating circuit for semi-conductor devices for removing a threshold voltage loss in clamping and charge transfer devices to increase an efficiency of the semiconductor device.

2. Description of the Prior Art

In a semi-conductor device of the type called a complementary MOS (CMOS), there has sometimes been needed a high voltage above a source voltage Vcc or a negative voltage below a ground voltage Vss.

For example, the high voltage above the source voltage Vcc is mainly used to overcome a threshold voltage loss being present in n-channel MOSFETs in the transfer of a logic high state, such as a word line potential for perfect transfer of the source voltage Vcc corresponding to storage data "1" into a memory cell in a dynamic RAM (DRAM) or a drive potential for driving of a pull-up gate using n-channel MOSFETs in an output buffer; the negative voltage below the ground voltage Vss is used as a bias voltage of a p-type substrate.

Figure 1:
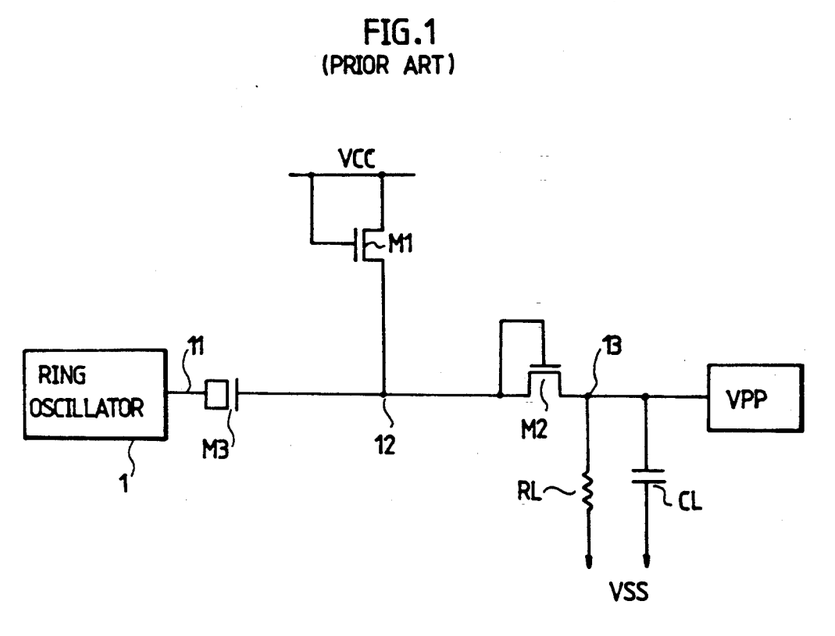
FIG. 1 is a circuit diagram of a conventional high voltage generating circuit for semi-conductor devices.

With reference to FIG. 1, there is shown a circuit diagram of a conventional high voltage generating circuit for semi-conductor devices. The illustrated circuit comprises a ring oscillator 1 as a oscillation signal generator, a n-channel MOSFET M3 including its common source-drain stage coupled to an oscillation signal $\phi osc1$ generated from the ring oscillator 1, for functioning as a charge pump, a n-channel MOSFET M1 including its drain and gate, both coupled to a source voltage Vcc and its source connected to the gate of the n-channel MOSFET M3, for clamping-functioning, and a diode-type n-channel MOSFET M2 including its drain and gate, both connected to the gate of the n-channel MOSFET M3.

Figure 2:
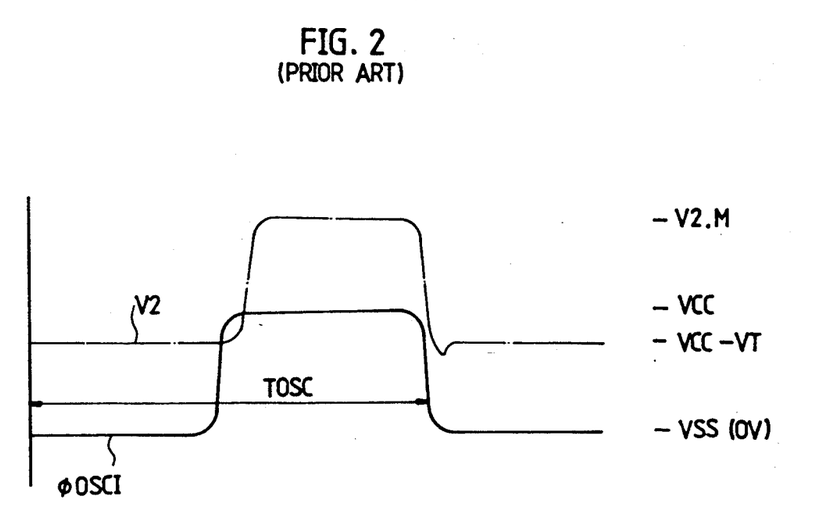
FIG. 2 is a waveform diagram of signals from respective components in FIG. 1.

The operation of the conventional high voltage generating circuit for semi-conductor devices with the above-mentioned construction will be described with reference to FIG. 2.

The ring oscillator 1 generates the oscillation signal $\phi osc1$ oscillating with a constant period Tosc and a magnitude of amplitude of the source voltage Vcc. When the oscillation signal $\phi osc1$ is at the ground voltage Vss level, a node 12 at the gate stage of the n-channel MOSFET M3 is charged with a voltage Vcc-Vt resulting from a threshold voltage loss on the source voltage Vcc through the n-channel MOSFET M1. If the oscillation signal $\phi osc1$ is transited from the ground voltage Vss level to the source voltage Vcc level, a voltage V2 at the node 12 is transited, according to the coupling effect, from a voltage Vcc-Vth level lower by a threshold voltage Vth than the source voltage Vcc to a voltage V2,M level above the source voltage Vcc, because of impossibility of instant variation of voltages at the common source-drain stage and the gate stage of the n-channel MOSFET M3. Then, the voltage V2,M at the node 12 is transferred to an output stage Vpp by turning on of the diode-type n-channel MOSFET M2, the drain and the gate of which are connected to the node 12, and hence is charged into a load capacitor CL.

Through the repetition of the oscillating operation as mentioned above is prevented a leakage current through a load resistor RL, and thus the potential at the output stage Vpp can rise, but the threshold voltage loss on the n-channel MOSFETs M1 and M2 causes the operation efficiency to be not high.

That is, the charged potential at the node 12 is maintained at a voltage Vcc-Vt1 level lower by a threshold voltage Vt1 on the n-channel MOSFET M1 than the source voltage Vcc due to the threshold voltage loss on the n-channel MOSFET M1, and the high voltage applied to the node 12 by the operation of the n-channel MOSFET M3 is transferred to the output stage Vpp, with suffering a threshold voltage Vt2 loss on the n-channel MOSFET M2. As a result, the maximum potential at the output stage Vpp is at a voltage V2,M-Vt2 level lower by the threshold voltage Vt2 on the n-channel MOSFET M2 than the voltage V2,M.

For the purpose of the improvement in the above-stated problem, there has been proposed a high voltage generating circuit with a cross-coupled charge pump.

Figure 3:
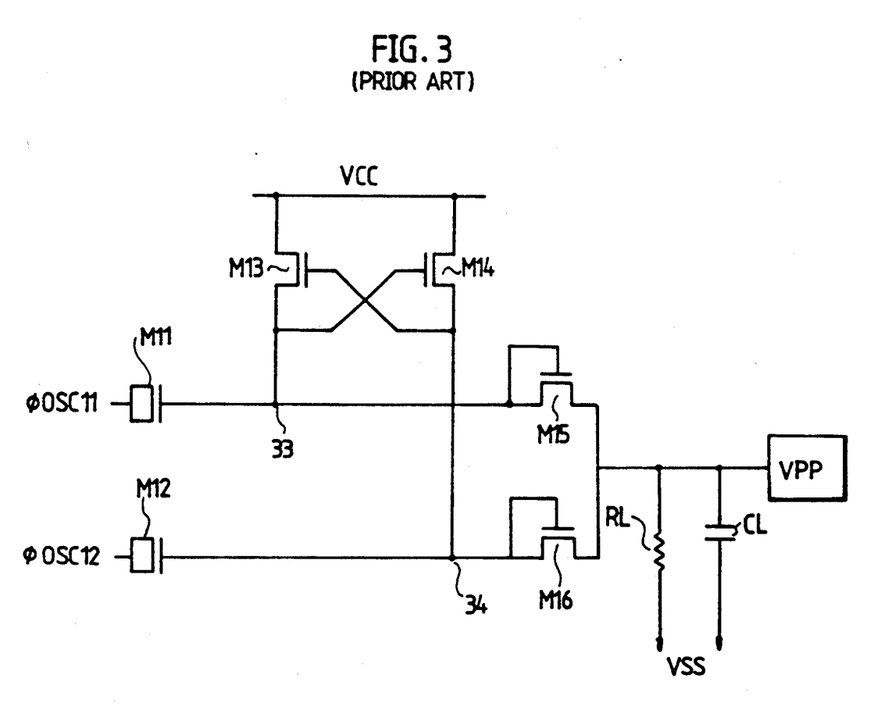
FIG. 3 is a circuit diagram of a conventional high voltage generating circuit with a cross-coupled charge pump.

With reference to FIG. 3, there is shown a circuit diagram of the conventional high voltage generating circuit with the cross-coupled charge pump. The illustrated circuit comprises a n-channel MOSFET M11 including its common source-drain stage coupled to a first oscillation signal $\phi osc11$ generated from a ring oscillator, for functioning as a charge pump, a n-channel MOSFET M12 including its common source-drain stage coupled to a second oscillation signal $\phi osc12$ generated from the ring oscillator, for functioning as a charge pump, a pair of n-channel MOSFETs M13 and M14 including their sources connected respectively to gates of the n-channel MOSFETs M11 and M12, their drains coupled to a source voltage Vcc and their gates cross-coupled to their sources, for clamping-functioning, and a pair of diode-type n-channel MOSFETs M15 and M16 including their drains and gates, both connected respectively to the gates of the n-channel MOSFETs M11 and M12. Herein, the first and second oscillation signals $\phi osc11$ and $\phi osc12$ each has a magnitude of amplitude of the source voltage Vcc and a phase difference of 180° with respect to each other.

Figure 4:
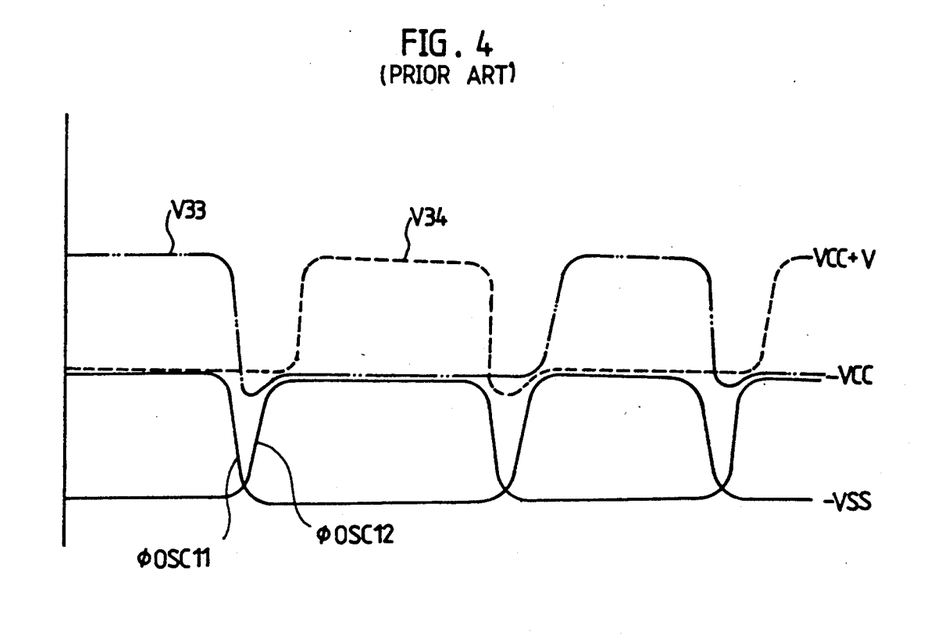
FIG. 4 is a waveform diagram of signals from respective components in FIG. 3.

The operation of the conventional high voltage generating circuit with the cross-coupled charge pump constructed as stated above will be described with reference to FIG. 4.

If the first oscillation signal $\phi osc11$ is at the source voltage Vcc level and the second oscillation signal $\phi osc12$ is at the ground voltage Vss level, a node 33 at the gate stage of the capacitor-type n-channel MOSFET M11 is at a voltage level above the source voltage Vcc, thereby allowing cross-coupled n-channel MOSFET M14 to be turned on. As a result, the turning on of the n-channel MOSFET M14 allows a node 34 at the gate stage of the capacitor-type n-channel MOSFET M12 to be charged with the source voltage Vcc with no threshold voltage loss and hence the capacitor-type n-channel MOSFET M12 to be charged with similarly.

When the first oscillation signal $\phi osc11$ is transited from the source voltage Vcc level to the ground voltage Vss level and the second oscillation signal $\phi osc12$ is transited from the ground voltage Vss level to the source voltage Vcc level, the node 34 at the gate stage of the capacitor-type n-channel MOSFET M12 is at a voltage level above the source voltage Vcc by the operation of the n-channel MOSFET M12, thereby allowing the cross-coupled n-channel MOSFET M13 to be turned on. As a result, the turning on of the n-channel MOSFET M13 allows the node 33 at the gate stage of the capacitor-type n-channel MOSFET M11 to be charged with the source voltage Vcc with no threshold voltage loss and hence the capacitor-type n-channel MOSFET M11 to be charged with similarly.

Therefore, the potential at the node 34 is transited from the source voltage Vcc level to a voltage Vcc+V level above the source voltage Vcc and the diode-type n-channel MOSFET M16, the drain and the gate of which are connected to the node 34, is turned on, thereby allowing the voltage Vcc+V at the node 34 to be transferred to an output stage Vpp and to be charged into a load capacitor CL.

Therefore, the high voltage generating circuit with the cross-coupled charge pump as mentioned above is capable of removing the threshold voltage loss involved in the conventional diode-type clamping device and redoubling a duty cycle on time in comparison with the conventional high voltage generating circuit by means of two oscillation signals with a phase difference of 180° and capacitors M11 and M12 activated by the oscillation signals.

However, the conventional high voltage generating circuit with the cross-coupled charge pump has a disadvantage, in that there is present a threshold voltage loss on the diode-type n-channel MOSFETs M15 and M16 at the output stage.

SUMMARY OF THE INVENTION

Therefore, the present invention has been made in view of the above problems, and an object of the present invention is to provide a high voltage generating circuit for semi-conductor devices for removing a threshold voltage loss in clamping and charge transfer devices to increase an efficiency of the semi-conductor device.

The above and other objects can be accomplished by a provision of a high voltage generating circuit for semi-conductor devices which removes a threshold voltage and generates a high voltage above a source voltage or a negative voltage below a ground voltage, comprising: oscillation signal generating means for generating an input oscillation signal and first through fourth oscillation signals; first clamping means connected to said oscillation signal generating means and coupled to said source voltage, for inputting said third oscillation signal from said oscillation signal generating means; second clamping means connected to said oscillation signal generating means and coupled to said source voltage, for inputting said fourth oscillation signal from said oscillation signal generating means; first charge pump means connected to said oscillation signal generating means and to an output stage of said first clamping means, for inputting said second oscillation signal from said oscillation signal generating means; second charge pump means connected to said oscillation signal generating means and to an output stage of said second clamping means, for inputting said first oscillation signal from said oscillation signal generating means; and charge transfer means including its input stage connected to output stages of said first and second charge pump means and said output stages of said first and second clamping means and its output stage connected to a final output stage.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Figure 5:
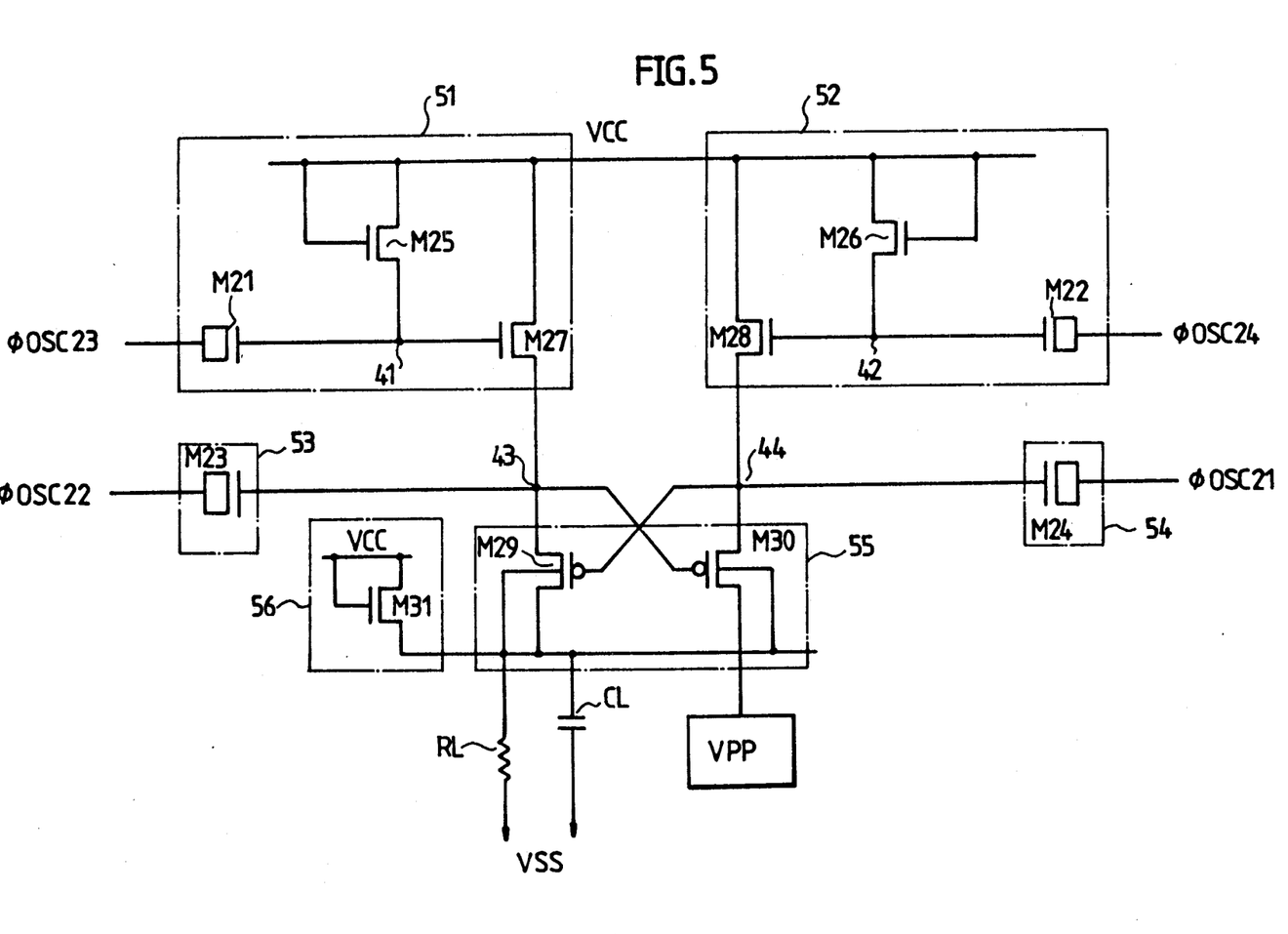
FIG. 5 is a circuit diagram of a high voltage generating circuit for semi-conductor devices in accordance with the present invention.
Figure 6:
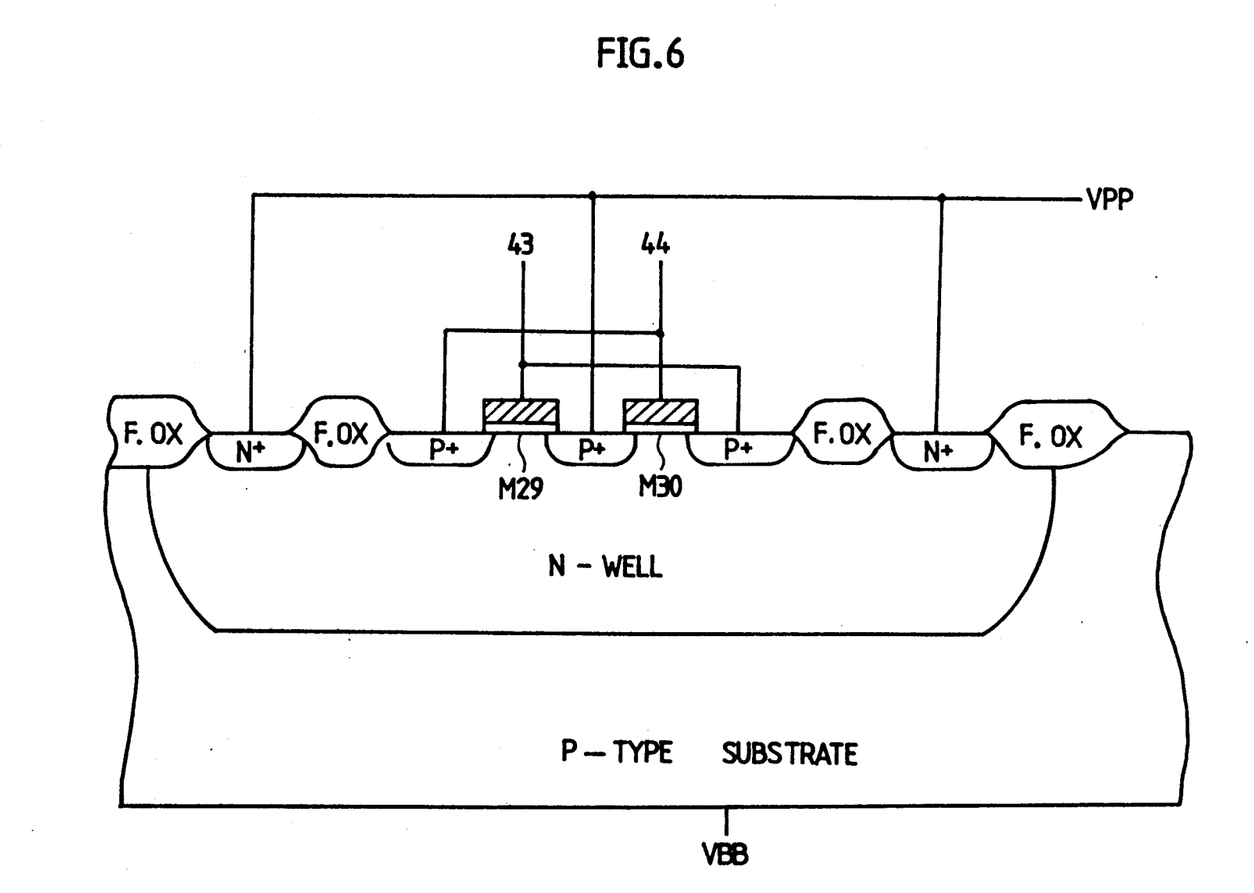
FIG. 6 is a sectional view of a N-well embodying the circuit in FIG. 5.
Figure 7:
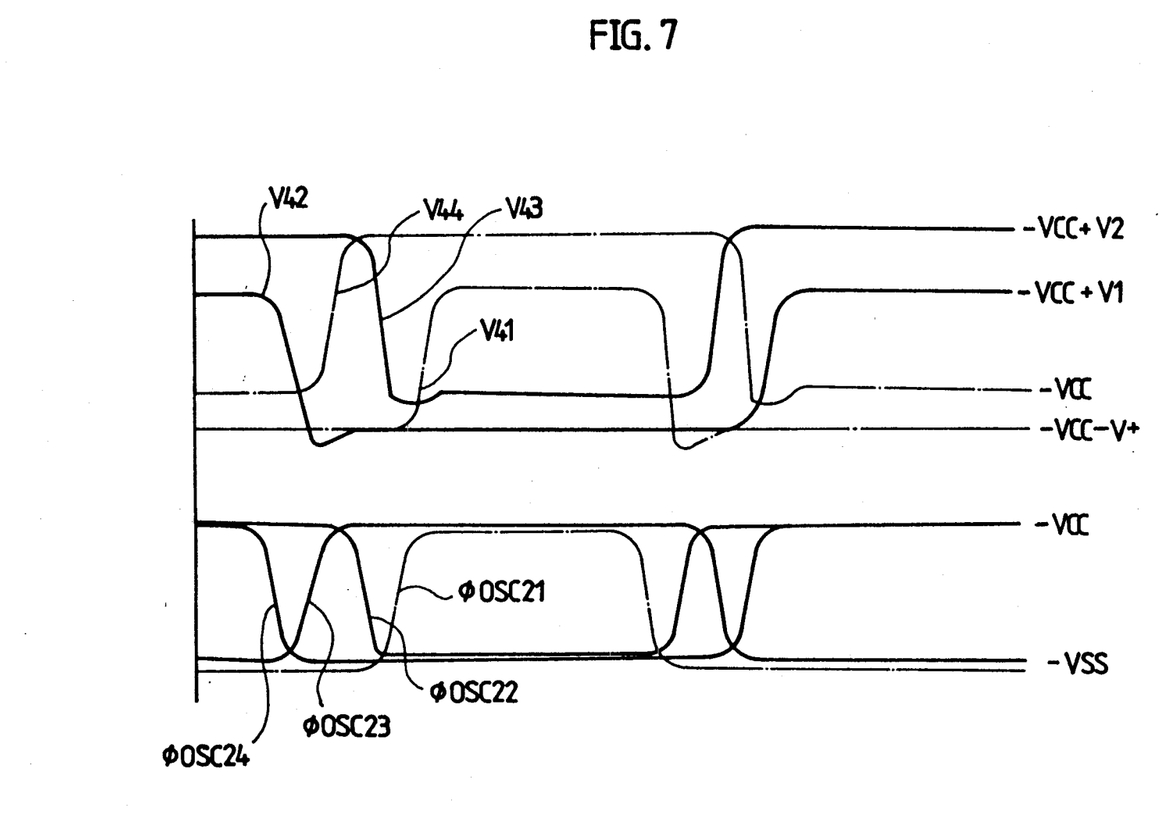
FIG. 7 is a waveform diagram of signals from respective components in FIG. 5.
Figure 8:
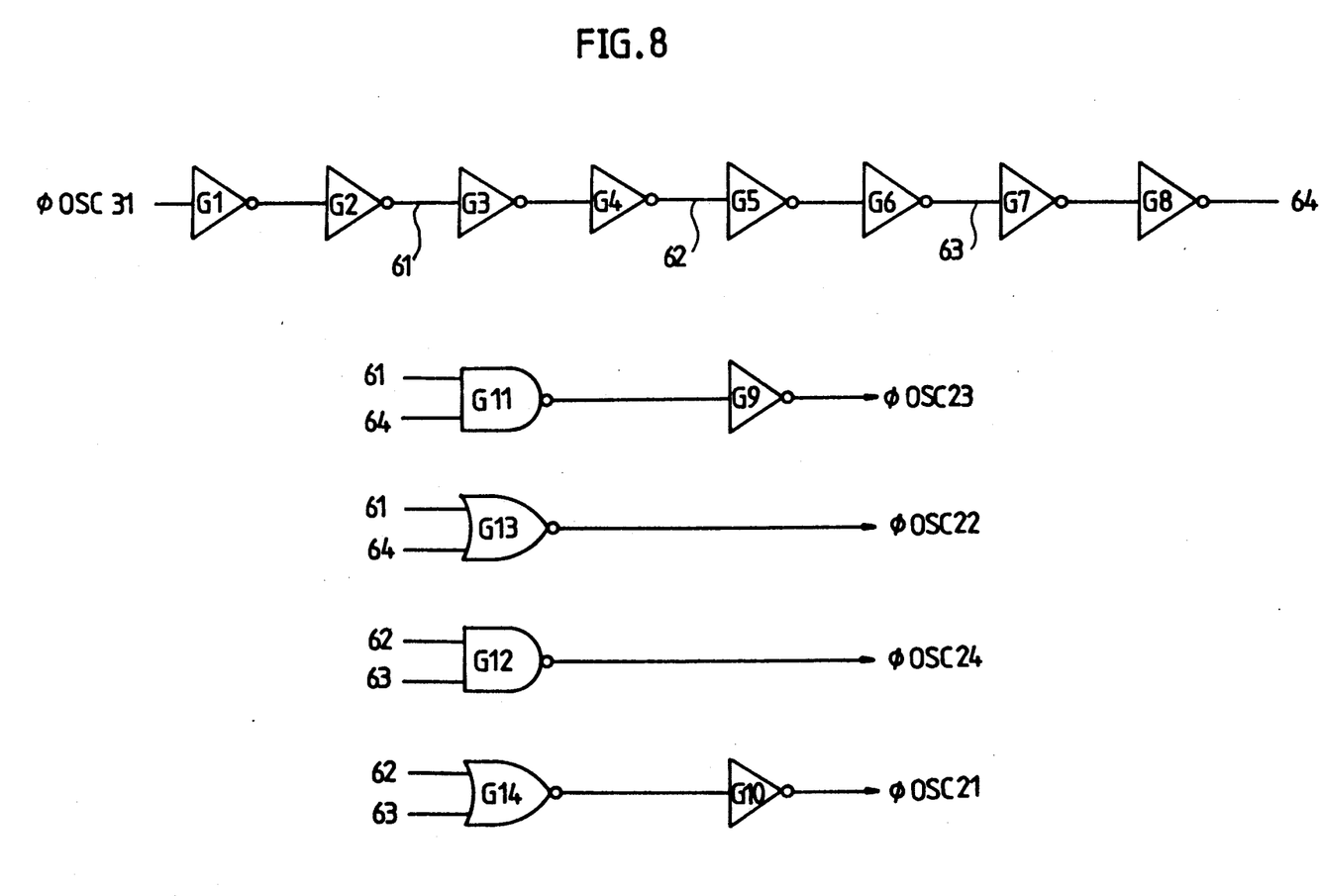
FIG. 8 is a logic circuit diagram of an oscillation signal generating circuit in FIG. 5.

FIG. 5 is a circuit diagram of a high voltage generating circuit for semi-conductor devices in accordance with the present invention, FIG. 6 is a sectional view of a N-well embodying the circuit in FIG. 5, FIG. 7 is a waveform diagram of signals from respective components in FIG. 5, and FIG. 8 is a logic circuit diagram of an oscillation signal generating circuit in FIG. 5. In these drawings, the reference numerals 51 and 52 are clamping circuits, 53 and 54 charge pump circuits, 55 a charge transfer circuit, 56 an initial state control circuit, M21 through M31 MOSFETs, RL a load resistor, CL a load capacitor, G1 through G10 inverters, G11 and G12 NAND gates, and G13 and G14 NOR gates, respectively.

First, a construction of a high voltage generating circuit for semi-conductor devices in accordance with the present invention will be mentioned with reference to FIG. 5.

With reference to FIG. 5, the high voltage generating circuit for semi-conductor devices in accordance with the present invention is shown to comprise clamping circuits 51 and 52, charge pump circuits 53 and 54, a charge transfer circuit 55 and an initial state control circuit 56.

The clamping circuit 51 is provided with a capacitor-type n-channel MOSFET M21 including its common source-drain stage coupled to a third oscillation signal $\phi osc23$ generated from a ring oscillator as an oscillation signal generating circuit, a diode-type n-channel MOSFET M25 including its gate and drain coupled to a source voltage Vcc and its source connected to a node 41 at the gate stage of the n-channel MOSFET M21, and a n-channel MOSFET M27 including its drain coupled to the source voltage Vcc and its gate connected to the node 41.

The clamping circuit 52 is provided with a capacitor-type n-channel MOSFET M22 including its common source-drain stage coupled to a fourth oscillation signal $\phi osc24$ generated from the ring oscillator, a diode-type n-channel MOSFET M26 including its gate and drain coupled to the source voltage Vcc and its source connected to a node 42 at the gate stage of the n-channel MOSFET M22, and a n-channel MOSFET M28 including its drain coupled to the source voltage Vcc and its gate connected to the node 42. Herein, the third and fourth oscillation signals φosc23 and φosc24 each has a phase difference of 180° with respect to each other.

The charge pump circuit 53 is provided with a capacitor-type n-channel MOSFET M23 including its common source-drain stage coupled to a second oscillation signal φosc22 from the ring oscillator and its gate connected to the source of the n-channel MOSFET M27, for functioning as a charge pump.

The charge pump circuit 54 is provided with a capacitor-type n-channel MOSFET M24 including its common source-drain stage coupled to a first oscillation signal φosc21 from the ring oscillator and its gate connected to the source of the n-channel MOSFET M28, for functioning as a charge pump. Herein, the first and second oscillation signals φosc21 and φosc22 each has a phase difference of 180° with respect to each other.

The charge transfer circuit 55 is provided with a p-channel MOSFET M29 including its source connected to a node 43 at the gate stage of the n-channel MOSFET M23, its gate cross-coupled to a node 44 at the gate stage of the n-channel MOSFET M24 and its drain connected to a final output stage Vpp, and a p-channel MOSFET M30 including its source connected to the node 44 at the gate stage of the n-channel MOSFET M24, its gate cross-coupled to the node 43 at the gate stage of the n-channel MOSFET M23 and its drain connected to the final output stage Vpp.

The initial state control circuit 56 is provided with a n-channel MOSFET M31 including its drain and gate coupled to the source voltage Vcc and its source connected to the final output stage Vpp, for controlling an initial state of the final output stage Vpp.

As shown in FIG. 8, the oscillation signals φosc21 through φosc24 are generated by the operation of logic gates relating to first to fourth delay signals outputted from respective output terminals of series connected inverters G1 through G8, which input an input oscillation signal φosc31 generated from the ring oscillator. Namely, the second oscillation signal φosc22 is produced by NORing the first delay signal 61 through the two inverters G1 and G2 and the fourth delay signal 64 through the eight inverters G1 to G8 by means of a NOR gate G13, and the first oscillation signal φosc21 is produced by NORing the second delay signal 62 through the four inverters G1 to G4 and the third delay signal 63 through the six inverters G1 to G6 by means of a NOR gate G14 and then inverting the NORed signal by means of an inverter 10. Also, the fourth oscillation signal φosc24 is produced by NANDing the second delay signal 62 and the third delay signal 63 by means of a NAND gate G12, and the third oscillation signal φosc23 is produced by NANDing the first delay signal 61 and the fourth delay signal 64 by means of a NAND gate G11 and then inverting the NANDed signal by means of an inverter 9.

Next, the operation of the high voltage generating circuit for semi-conductor devices with the above-mentioned construction in accordance with the present invention will be mentioned in detail with reference to FIG. 7.

First, it is supposed that, at the initial state, the fourth and second oscillation signals φosc24 and φosc22 are at the source voltage Vcc level and the third and first oscillation signals φosc23 and φosc21 are at the ground voltage Vss level, and the operation of the high voltage generating circuit will be described according to respective states of the oscillation signals.

Because the fourth oscillation signal φosc24 is at the source voltage Vcc level and the gate and drain of the n-channel MOSFET M26 are coupled to the source voltage Vcc, the node 42 at the gate stage of the capacitor-type n-channel MOSFET M22 is at a voltage Vcc=V1 level above the source voltage Vcc through the capacitor-type n-channel MOSFET M22, thereby allowing the n-channel MOSFET M28, the gate of which is connected to the node 42, to be turned on. As a result, the turning on of the n-channel MOSFET M28 allows the node 44 at the source stage of the n-channel MOSFET M28 to be charged with the source voltage Vcc with no threshold voltage loss and hence the capacitor-type n-channel MOSFET M24, the gate of which is connected to the node 44, to be charged with similarly.

Since the third oscillation signal φosc23 is at the ground voltage Vss level, the node 41 at the gate stage of the capacitor-type n-channel MOSFET M21 is maintained at a voltage Vcc-Vt level lower by a threshold voltage Vt on the n-channel MOSFET M25 than the source voltage Vcc due to the characteristic of the diode-type n-channel MOSFET M25, the gate and drain of which are coupled to the source voltage Vcc, for clamping-functioning. Also, because the second oscillation signal φosc22 is at the source voltage Vcc level, the node 43 at the gate stage of the n-channel MOSFET M23 is maintained at a high voltage Vcc=V2 level through the capacitor-type n-channel MOSFET M23. As a result, the node 44 at the gate stage of the capacitor-type n-channel MOSFET M24 is clamped which inputs the first oscillation signal φosc21 at the ground voltage Vss level at its common source-drain stage. Also, the n-channel MOSFET M27 is turned off, the gate of which is connected to the node 41, the drain of which is coupled to the source voltage Vcc and the source of which is connected to the node 43, thereby allowing the node 44 to be maintained at the source voltage Vcc level.

Because the node 43 is at the high voltage Vcc=V2 level above the source voltage Vcc and supposing that the output stage Vpp is at a voltage level above the source voltage Vcc, the p-channel MOSFET M29 is turned on, the gate of which is connected to the node 44, the source of which is connected to the node 43 and the drain of which is connected to the output stage Vpp, and the p-channel MOSFET M30 is turned off, the gate of which is connected to the node 43, the source of which is connected to the node 44 and the drain of which is connected to the output stage Vpp. As a result, the high voltage Vcc+V2 induced to the node 43 can be transferred to the output stage Vpp without any voltage loss.

Then, it is supposed that the third and first oscillation signals φosc23 and φosc21 are transited from the ground voltage Vss level to the source voltage Vcc level and the fourth and second oscillation signals φosc24 and φosc22 are transited from the source voltage Vcc level to the ground voltage Vss level, and the operation of the high voltage generating circuit will be described according to respective states of the oscillation signals.

If the third oscillation signal φosc23 is transited from the ground voltage Vss level to the source voltage Vcc level, the node 41 is at a voltage Vcc+V1 level above the source voltage Vcc by the clamping operation of the diode-type n-channel MOSFET M25 and through the capacitor-type n-channel MOSFET M21, thereby allowing the n-channel MOSFET M27, the gate of which is connected to the node 41, to be turned on. As a result, the turning on of the n-channel MOSFET M27 allows the node 43 to be charged with the source voltage Vcc with no threshold voltage loss and hence the capacitor-type n-channel MOSFET M23, the gate of which is connected to the node 43, to be charged with similarly.

Since the fourth oscillation signal $\phi osc24$ is at the ground voltage Vss level, the node 42 at the gate stage of the capacitor-type n-channel MOSFET M22 is maintained at a voltage Vcc-Vt level lower by a threshold voltage Vt on the n-channel MOSFET M26 than the source voltage Vcc due to the characteristic of the diode-type n-channel MOSFET M26, the gate and drain of which are coupled to the source voltage Vcc, for clamping-functioning. Also, because the first oscillation signal $\phi osc21$ is at the source voltage Vcc level, the node 44 at the gate stage of the capacitor-type n-channel MOSFET M24 is maintained at a high voltage Vcc+V2 level through the capacitor-type n-channel MOSFET M24. As a result, the n-channel MOSFET M28 is turned off, thereby allowing the node 43 to be maintained at the source voltage Vcc level.

Because the node 44 is at the high voltage Vcc+V2 level above the source voltage Vcc and supposing that the output stage Vpp is at a voltage level above the source voltage Vcc, the p-channel MOSFET M29 is turned off and the p-channel MOSFET M30 cross-coupled with the p-channel MOSFET M29 is turned on. As a result, the high voltage Vcc+V2 induced to the node 44 can be transferred to the output stage Vpp without any voltage loss.

For the purpose of preventing a loss caused by a charge leakage during respective transition intervals of the oscillation signals $\phi osc21$ through $\phi osc24$, the second and third oscillation signals $\phi osc22$ and $\phi osc23$ should not be simultaneously at the ground voltage Vss level and the first and fourth oscillation signals $\phi osc21$ and $\phi osc24$ should not be simultaneously at the source voltage Vcc level.

Also in order to control the initial state of powering the semi-conductor device, the start-up operation is performed utilizing the n-channel MOSFET M31, the drain and gate of which are coupled to the source voltage Vcc and the source of which is connected to the output stage Vpp.

The n-channel MOSFETs M21 through M24 are utilized as a capacitor with a voltage being applied across the gate electrode and the common source-drain stage. For this reason, a channel is formed only in the case where a gate-source voltage VGS is above a threshold voltage. Therefore, a capacity of the capacitor, corresponding to the area of the gate electrode, produced by an oxide layer under the gate electrode is available as it is. Supposing that the gate-source voltage VGS is below the threshold voltage and thus the transistor is turned off, there is formed no channel, thereby causing the majority of gate capacitance to be jammed between a substrate and a gate node.

Hence, when the power will be turned on, the output stage Vpp will be charged in a stable condition in a short time after power on, only in the case where the n-channel MOSFETs M21 through M24 are turned on.

If the power is turned on, all of nodes are instantaneously maintained at the ground voltage Vss level and then raised to the source voltage Vcc level with maintaining a stable value. As a result, the n-channel MOSFETs M25 and M26 allow the nodes 41 and 42 to be charged with the voltage Vcc-Vt lower by the threshold voltage Vt than the source voltage Vcc, respectively, and then the n-channel MOSFETs M25 and M26 allow the nodes 43 and 44 to be charged with the voltage Vcc-2Vt lower by the threshold voltage 2Vt (i.e., the voltage through two n-channel MOSFET) than the source voltage Vcc, respectively. This meets the above condition.

The n-channel MOSFET M31 adapted to control the initial state as mentioned above allows the output stage Vpp to be charged with the voltage Vcc-Vt lower by the threshold voltage Vt than the source voltage Vcc only when the power is turned on and then continues to be maintained at the off state when the output stage Vpp is charged with a voltage above the source voltage Vcc.

With reference to FIG. 6, there is shown a sectional view of a N-well on a p-type substrate embodying the high voltage generating circuit for semi-conductor devices with the above-mentioned construction in accordance with the present invention.

On the N-well being a substrate of the p-channel MOSFET is connected the output stage Vpp. When potentials at the nodes 43 and 44 are got to be higher than the potential of the output stage Vpp, the charge transfer operation through the channel is performed and, at the same time, a P-N junction between the nodes 43 and 44 and the output stage Vpp is turned on, thereby allowing the charge transfer operation to be performed.

As hereinbefore described, in the semi-conductor device of the type called a complementary MOS (CMOS) requiring a high voltage above the source voltage, there is provided the high voltage generating circuit for removing a threshold voltage loss in clamping and charge transfer devices to increase an efficiency of the semi-conductor device. Therefore, a sufficient high voltage above the source voltage can be used to prevent a malfunction of the semi-conductor device.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A high voltage generating circuit for semi-conductor devices which removes a threshold voltage and generates a high voltage above a source voltage or a negative voltage below a ground voltage, comprising:
    oscillation signal generating means for generating an input oscillation signal and first through fourth oscillation signals;
    first clamping means connected to said oscillation signal generating means and coupled to said source voltage, for inputting said third oscillation signal from said oscillation signal generating means;
    second clamping means connected to said oscillation signal generating means and coupled to said source voltage, for inputting said fourth oscillation signal from said oscillation signal generating means;
    first charge pump means connected to said oscillation signal generating means and to an output stage of said first clamping means, for inputting said second oscillation signal from said oscillation signal generating means;

second charge pump means connected to said oscillation signal generating means and to an output stage of said second clamping means, for inputting said first oscillation signal from said oscillation signal generating means; and charge transfer means including its input stage connected to output stages of said first and second charge pump means and said output stages of said first and second clamping means and its output stage connected to a final output stage.

2. A high voltage generating circuit for semi-conductor devices, as set forth in claim 1, further comprising:

initial state control means provided with a first diode-type n-channel MOSFET including its drain and gate coupled to said source voltage and its source connected to said final output stage.

3. A high voltage generating circuit for semi-conductor devices, as set forth in claim 2, wherein said first clamping means includes:

a second capacitor-type n-channel MOSFET including its common source-drain stage coupled to said third oscillation signal;

a third diode-type n-channel MOSFET including its gate and drain coupled to said source voltage and its source connected to the gate of said second n-channel MOSFET; and a fourth n-channel MOSFET including its drain coupled to said source voltage, its gate connected to the gate of said second n-channel MOSFET and its source connected to said first charge pump means.

4. A high voltage generating circuit for semi-conductor devices, as set forth in claim 3, wherein said second clamping means includes:

a fifth capacitor-type n-channel MOSFET including its common source-drain stage coupled to said fourth oscillation signal;

a sixth diode-type n-channel MOSFET including its gate and drain coupled to said source voltage and its source connected to the gate of said fifth n-channel MOSFET; and a seventh n-channel MOSFET including its drain coupled to said source voltage, its gate connected to the gate of said fifth n-channel MOSFET and its source connected to said second charge pump means.

5. A high voltage generating circuit for semi-conductor devices, as set forth in claim 1, wherein said charge transfer means includes first and second p-channel MOSFETs including their gates and sources cross-coupled to said output stages of said first and second clamping means and their drains connected to said final output stage.

6. A high voltage generating circuit for semi-conductor devices, as set forth in claim 1, wherein said oscillation signal generating means includes first and second NOR gates, first and second NAND gates, first through eighth series connected inverters, and ninth and tenth inverters connected respectively to output terminals of said first NAND gate and second NOR gate, for generating said first through fourth oscillation signals.

7. A high voltage generating circuit for semi-conductor devices, as set forth in claim 6, wherein said fourth oscillation signal is produced by NANDing a second delay signal and a third delay signal by means of said second NAND gate, said second delay signal being produced by delaying said input oscillation signal generated from said oscillation signal generating means through said first to fourth series connected inverters and said third delay signal being produced by delaying said input oscillation signal generated from said oscillation signal generating means through said first to sixth inverters.

8. A high voltage generating circuit for semi-conductor devices, as set forth in claim 6, wherein said third oscillation signal is produced by NANDing a first delay signal and a fourth delay signal by means of said first NAND gate and then inverting the NANDed signal by means of said ninth inverter, said first delay signal being produced by delaying said input oscillation signal generated from said oscillation signal generating means through said first and second series connected inverters and said fourth delay signal being produced by delaying said input oscillation signal generated from said oscillation signal generating means through said first to eighth inverters.

9. A high voltage generating circuit for semi-conductor devices, as set forth in claim 6, wherein said second oscillation signal is produced by NORing said first delay signal and said fourth delay signal by means of said first NOR gate.

10. A high voltage generating circuit for semi-conductor devices, as set forth in claim 6, wherein said first oscillation signal is produced by NORing said second delay signal and said third delay signal by means of said second NOR gate and then inverting the NORed signal by means of said tenth inverter.

* * * * *